(12) United States Patent
Bergmann et al.

(10) Patent No.: US 12,500,501 B2
(45) Date of Patent: Dec. 16, 2025

(54) PLANAR MOTOR AND METHOD FOR ACTUATING A PLANAR MOTOR

(71) Applicant: Lars Bergmann, Roßdorf (DE)

(72) Inventors: Lars B. Bergmann, Roßdorf (DE); Stephan Roth, Berlin (DE)

(73) Assignee: Lars Bergmann, Roßdorf (DE)

( * ) Notice: Subject to any disclaimer, the term of this patent is extended or adjusted under 35 U.S.C. 154(b) by 14 days.

(21) Appl. No.: 18/260,576

(22) PCT Filed: Jan. 10, 2022

(86) PCT No.: PCT/EP2022/050361
§ 371 (c)(1),
(2) Date: Jul. 6, 2023

(87) PCT Pub. No.: WO2022/148872
PCT Pub. Date: Jul. 14, 2022

(65) Prior Publication Data
US 2024/0055966 A1 Feb. 15, 2024

(30) Foreign Application Priority Data
Jan. 8, 2021 (DE) ..................... 10 2021 100 200.1

(51) Int. Cl.
  H02K 41/02 (2006.01)
  H02K 11/00 (2016.01)
  H02K 11/215 (2016.01)

(52) U.S. Cl.
  CPC ......... *H02K 41/02* (2013.01); *H02K 11/0094* (2013.01); *H02K 11/215* (2016.01); *H02K 2201/18* (2013.01)

(58) Field of Classification Search
  CPC .. H02K 41/02; H02K 11/215; H02K 11/0094; H02K 2201/18; H02K 16/00
  (Continued)

(56) References Cited

U.S. PATENT DOCUMENTS

| | | |
|---|---|---|
| 1,305,535 A | 6/1919 | Grabowiecki |
| 3,789,947 A | 2/1974 | Blumrich |
| (Continued) | | |

FOREIGN PATENT DOCUMENTS

| | | |
|---|---|---|
| DE | 19530341 A1 | 2/1997 |
| EP | 0871284 A2 | 10/1998 |
| (Continued) | | |

OTHER PUBLICATIONS

International Search Report (with English translation) for Application No. PCT/EP2022/050361, dated Apr. 25, 2022, 5 pages.

*Primary Examiner* — Jose A Gonzalez Quinones
(74) *Attorney, Agent, or Firm* — Dority & Manning, P.A.

(57) ABSTRACT

A planar motor has at least one transport unit with permanent magnets covering a predetermined area of the transport unit and a plurality of electromagnets capable of moving the transport unit in directions x and y. The electromagnets are distributed over the surface area of the motor, with their density being selected such that there are three to twelve electromagnets effecting movement in the same direction under the area of the transport unit covered by the permanent magnets at all times. The density of the electromagnets is reduced compared to other planar motors, depending on the area of the transport unit covered by permanent magnets, thereby reducing costs. The number of electronic elements is lower, and because of the spacing, there is lower heat generation and improved heat dissipation. A minimum density of electromagnets ensures that the transport unit can be moved in at least one direction at every position.

21 Claims, 9 Drawing Sheets

(58) Field of Classification Search
USPC .............................. 310/12.01, 12.03, 12.05
See application file for complete search history.

(56) References Cited

U.S. PATENT DOCUMENTS

| | | | |
|---|---|---|---|
| 3,876,255 | A | 4/1975 | Ilon |
| 11,552,524 | B2* | 1/2023 | Brinkmann ............ H02K 5/225 |
| 2005/0116548 | A1 | 6/2005 | Oisugu et al. |
| 2012/0300186 | A1* | 11/2012 | Butler .................. G05B 19/418 |
| | | | 355/72 |
| 2012/0328836 | A1* | 12/2012 | Binnad ............... G03F 7/70758 |
| | | | 355/72 |
| 2013/0258307 | A1 | 10/2013 | Mahadeswaraswamy et al. |
| 2015/0241794 | A1 | 8/2015 | Yang et al. |
| 2017/0179806 | A1* | 6/2017 | Lu ........................... H02N 15/00 |
| 2020/0303997 | A1 | 9/2020 | Brinkmann et al. |

FOREIGN PATENT DOCUMENTS

| | | |
|---|---|---|
| EP | 1443632 A2 | 8/2004 |
| JP | 2014003211 A | 1/2014 |
| WO | WO 2008148513 A1 | 12/2008 |
| WO | WO 2009146821 A1 | 12/2009 |

* cited by examiner

PLANAR MOTOR AND METHOD FOR ACTUATING A PLANAR MOTOR

CROSS-REFERENCE TO RELATED APPLICATIONS

This application is a US national phase of International Patent Application No. PCT/EP2022/050361 filed on Jan. 10, 2022, which is based upon and claims the right of priority to German Patent Application No. DE 102021100200.1 filed Jan. 8, 2021, the disclosures of both of which are hereby incorporated herein in their entirety for all purposes.

TECHNICAL BACKGROUND

The invention relates to a planar motor. Such devices are used primarily for moving loads in more than one dimension or direction. They are used, for example, in positioning systems, including photolithography systems for chip manufacture, but can also be used on a larger scale, e.g. in storage systems or the like.

PRIOR ART

A planar motor is described, for example, in EP 1 443 632 A2. A more advanced design suitable e.g. for logistics systems, can be found in WO 2008/148513 A1. The known systems of this kind are all characterized by high acquisition and especially operating costs, partly due to high power consumption.

Especially if the arrangement of the drive elements, for example electromagnets, is not completely symmetrical or not optimally matched to the arrangement of the magnets on the moving components of the planar motor, corrections to the direction of movement are constantly required during movement. Consequently, the direction of movement is constantly readjusted, which additionally increases power consumption.

Problem

The object of the invention is to provide a planar motor and a method for actuating a planar motor with increased efficiency and reduced costs.

Solution

This object is solved by the subject matter of the independent claims. Advantageous embodiments of the subject matter of the independent claims are characterized in the sub-claims. The wording of all claims is hereby incorporated into this description by reference.

The use of the singular is not intended to exclude the plural, which is also to apply in the reverse sense, unless otherwise disclosed.

To solve the problem, a planar motor is proposed, having at least one transport unit with permanent magnets. The permanent magnets cover a predetermined area of the transport unit, wherein covering means that the predetermined area is essentially covered—there may be or should be gaps or spaces between the permanent magnets. The permanent magnets are typically attached to the transport unit in such a way that either the north pole is at the top and the south pole at the bottom, or vice versa. This orientation may also occur alternately, or in any other combination. The transport unit has a predetermined length and a predetermined width.

The planar motor has a plurality of electromagnets, wherein the electromagnets are designed and arranged such that they are able to move the transport unit in directions x and y. Movements in directions x and y are only the preferred directions of movement. However, diagonal movements and also rotations are also possible.

A fixed number of electromagnets are grouped into drive units. The fixed number is at least three and at most eighteen, wherein the electromagnets grouped in a drive unit cause the transport unit to move in the same direction. These drive units have a predetermined length and a predetermined width and can be arranged in a grid, for example.

The smaller dimension of length or width of the transport unit corresponds to at least the sum of twice the length of a drive unit and twice the width of a drive unit. The sum of three times the length of a drive unit and three times the width of a drive unit is also preferred, as well as other, larger multiples thereof.

The drive units are arranged distributed over the surface area of the planar motor in such a way that exactly two drive units that effect movement in direction x and exactly two drive units that effect movement in direction y are located below the predetermined area of the transport unit covered by the permanent magnets at all times, wherein drive units partially located below the predetermined area are counted as a corresponding fraction. This always ensures optimum mobility of the transport unit in both direction x and direction y.

Due to the specified minimum ratio between the width of the transport unit and the length of the drive units, a regular arrangement of these drive units is possible, e.g. respectively two drive units acting in direction x and two drive units acting in direction y in the form of a cross, with the drive units forming the arms of the cross and the center remaining free. The size of the transport unit, in particular its length, then determines how far apart these crosses must be located.

Because the density of the drive units—matched to the area of the transport unit occupied by permanent magnets—is limited and reduced compared to other planar motors, the costs of this planar motor are significantly reduced. The number of electromagnets and the number of electronic elements for controlling them are smaller than in other planar motors, and the spacing also means that heat generation is lower and heat dissipation is better, so there is no need for elaborate cooling systems. The arrangement of the electromagnets in drive units also ensures greater clarity and modularity. The specified minimum/maximum density of drive units nevertheless ensures that the transport unit is movable in at least one direction at each position until the area of the transport unit covered by permanent magnets is above drive units that effect movement in the other direction.

As a rule, the electromagnets for driving the transport unit are permanently installed in the planar motor, which may form the floor of a transport level or a warehouse. Transport units move over this floor, driven by the electromagnets inside.

The problem is also solved by a planar motor having at least one transport unit with permanent magnets. The permanent magnets cover a predetermined area of the transport unit. The permanent magnets are typically attached to the transport unit in such a way that either the north pole is at the top and the south pole at the bottom, or vice versa. This orientation may also occur alternately, or in any other combination. The transport unit has a predetermined length and a predetermined width.

The surface motor has a plurality of electromagnets, wherein the electromagnets are designed and arranged such that they are able to move the transport unit in directions x and y. Movements in directions x and y are only the preferred directions of movement.

A fixed number of electromagnets are grouped into drive units. The fixed number is at least three and at most eighteen, wherein the electromagnets grouped in a drive unit cause the transport unit to move in the same direction. These drive units have a predetermined length and a predetermined width and can be arranged in a grid, for example.

The smaller dimension of length or width of the transport unit corresponds to at least the sum of twice the length of a drive unit and twice the width of a of a drive unit.

The drive units are arranged distributed over the surface area of the planar motor in such a way that exactly one drive unit, which effects a movement in direction x, and exactly one drive unit, which effects a movement in direction y, is located below the predetermined area of the transport unit covered by the permanent magnets at all times, wherein drive units partially located below the predetermined area are counted as a corresponding fraction.

This ensures mobility of the transport unit at least in both direction x and direction y.

Because the density of the drive units—matched to the area of the transport unit occupied by permanent magnets—is limited and greatly reduced compared with other planar motors, the costs of this planar motor are significantly reduced. The number of electromagnets as well as the number of electronic elements for their control is lower than in other planar motors, and due to the separation the heat generation is also lower and the heat dissipation better, so that elaborate cooling systems can be dispensed with. The specified minimum/maximum density of drive units nevertheless ensures that the transport unit is movable in at least one direction at each position until the area of the transport unit covered by permanent magnets is located above drive units that effect movement in the other direction.

The effectiveness of power transmission between electromagnets and the transport unit can be improved if a predetermined number of electromagnets have a common yoke. This also leads to a further reduction in energy consumption.

A further cost reduction is achieved if the coils of the electromagnets are made of copper-clad aluminum wire. Typically, an insulating layer is also applied as the top layer for electrical insulation. Each electromagnet has at least one coil. Aluminum is significantly cheaper to produce/purchase than copper. A copper cladding is nevertheless advantageous, since copper has better conductivity and better contacting properties than aluminum. This is particularly important for connections, contacts, clamping connections, etc.

For use in the logistics sector, it is particularly advantageous if the transport unit has either
  a square or rectangular base and/or
  a base with dimensions corresponding to a standard for load carriers, in particular pallets and/or
  in particular a base with the dimensions of a Euro pallet.
In this way, a particularly high packing density can be achieved in a warehouse.

In an advantageous embodiment of the planar motor, the predetermined area of the transport unit covered by the permanent magnets is cruciform. This also saves costs, because the area covered by the permanent magnets is smaller than if the entire underside of the transport unit were covered or a different pattern were selected for the arrangement of the permanent magnets. Nevertheless, the longest possible area is covered with permanent magnets in both direction x and direction y so that the transport unit can still be controlled easily. Due to the cruciform arrangement, there are also optimally free areas which can be occupied, for example, by support devices for the transport unit.

In principle, the permanent magnets on the transport unit must guarantee overlapping of the electromagnets in the planar motor. Instead of a cross pattern, an H-pattern, frame pattern or parallel bar pattern can also be used.

The controllability of the transport unit and the driving force can be further improved if the permanent magnets are rectangular and uninterrupted. In this case, the long sides of the rectangular permanent magnets are each arranged perpendicular to the direction of the arms of the cruciform surface they cover. In principle, of course, the permanent magnets may also have other shapes, such as square or round.

Optimum movability of the transport unit is achieved if the transport unit has a wheel and/or roller system that allows movement in any direction.

Preferably, the wheel and/or roller system of the transport units is formed as either
  multiaxial rollers,
  ball transfer units,
  omniwheels,
  Mecanum wheels or
  swivel castors All these systems allow movements in any direction. With the exception of the swivel castors, the other variants mentioned in particular also allow directional changes without additional resistance. Multiaxial rollers, the design of which is explained further below, are particularly preferred because they are simpler in design than omniwheels or Mecanum wheels and also avoid the noise, often perceived as unpleasant, which can occur with some of the variants mentioned.

The position of the transport unit can be determined cost-effectively and accurately if the planar motor has Hall sensors for detecting the position of the transport unit. The Hall sensors measure magnetic fields, in particular the magnetic field of the permanent magnets of the transport unit. In particular, it is preferred that the Hall sensors are arranged distributed over the surface area of the planar motor in such a way that at least one Hall sensor is located under the predetermined area of the transport unit covered by the permanent magnets at all times. This allows the position of the transport unit to be determined.

If two Hall sensors are located under the predetermined area of the transport unit covered by the permanent magnets at all times, the orientation of the transport unit can be determined in addition to the position.

It is particularly preferred that the Hall sensors are distributed over the surface area of the planar motor such that at least three Hall sensors are located under the predetermined area of the transport unit covered by the permanent magnets at all times. This further increases the accuracy of the position and orientation determination of the transport unit.

The position of the transport unit can be determined even more cost-effectively with inductive proximity switches.

For the starting behavior of the planar motor it is particularly advantageous if the fixed number of electromagnets grouped in a drive unit is an integer multiple of three. If the distances between the electromagnets and the distances between the permanent magnets of the transport unit are matched to each other, it is then possible to accelerate the transport unit with the electromagnets from one drive unit without any problems, both forwards and backwards.

It is particularly preferred that exactly six electromagnets are grouped in a drive unit for one direction of movement.

This represents an optimum compromise between good starting behavior and small size of the drive unit and makes it possible to maintain the density of the electromagnets in the area of the linear motor described above in a particularly simple manner.

The drive units are particularly effective if the respective electromagnets grouped in a drive unit are shaped and arranged in such a way that their largest extension is oriented perpendicularly to the respective drive direction, and if they are arranged one behind the other in this drive direction. Due to the arrangement perpendicular to the drive direction, the entire length of the respective electromagnet can contribute equally to the drive force, provided that a permanent magnet is available on the transport unit as a counterpart.

The drive units can be made particularly compact if the electromagnets of a drive unit have a common yoke. This also enables a more favorable alignment of the generated magnetic fields.

Optimum coordination of the components with one another, which enables particularly good starting of the transport unit, is achieved if the permanent magnets covering the predetermined area of the transport unit are each arranged at a distance from one another corresponding to 1.25 to 1.75 times, in particular 1.5 times, the distance between the electromagnets in a drive unit. Then, in particular, every third electromagnet in a drive unit located under the transport unit is in the optimum position relative to a permanent magnet to effect acceleration in one direction.

In a particularly preferred embodiment of the planar motor, exactly three, six or nine electromagnets are grouped in a drive unit, preferably six. The length and/or the width of the transport unit corresponds to at least four times the length of a drive unit. The length of the transport unit can thus also correspond to five times, six times, seven times, eight times, etc. the length of a drive unit. In these cases, the distances between the drive units can be correspondingly larger, which further reduces the cost per area and reinforces the advantages mentioned above.

The planar motor is preferably operated with alternating current. On the one hand, direct current would lead to high costs and heat generation. On the other hand, the alternating current can be used to form the traveling wave in the planar motor, which is a prerequisite for driving the transport units. For this purpose, the alternating current is operated at exactly the frequency required for the speed of the travelling wave needed to drive the transport unit. Frequency converters are used to generate the required frequency.

There are several ways to limit the number of frequency converters to keep the cost of the planar motor low. The most expensive option would be to equip each drive unit with its own frequency converter. A more favorable solution is to install only one frequency converter for each predetermined area of the transport unit covered by the permanent magnets.

The costs are even lower if, in the case of an planar motor as described above, the drive units are arranged in rows and columns of a matrix, with the drive units being assigned either to the rows or to the columns of the matrix, depending on whether they effect a transport unit to move in direction x or in direction y. The planar motor then has exactly one frequency converter for each row and for each column of the matrix. Furthermore, zero, two or three electronic contactors and/or relays or zero or two analog contactors are typical for each drive unit. The frequency converters supply power to the drive units, wherein all drive units assigned to the same row or column are supplied with power by the same frequency converter.

Hereby it is particularly advantageous that the number of frequency converters required to supply the electromagnets or drive units only scales linearly with the number of rows and columns. Their number would normally increase quadratically with the number of rows/columns. The method just described is therefore advantageous for planar motors with at least four drive units, and the advantage increases disproportionately as the size of the system increases. Since frequency converters are costly power electronics components, both the initial cost and the operating cost (due to power consumption) are reduced.

In principle, frequency converters are also sufficient on only one side of the planar motor. This further reduces the costs, but leads to restrictions in the flexibility of the control of the transport units.

Individual method steps are described in more detail below. The steps need not necessarily be carried out in the order given, and the method to be described may also include further unmentioned steps.

The problem is further solved by a method for actuating a planar motor. This method comprises the following steps:

1. A planar motor as described above is provided. In particular, this is a planar motor in which the drive units are assigned either to the rows or to the columns of a matrix depending on whether they effect a movement of the transport unit in direction x or in direction y, with exactly one frequency converter being present for each row and for each column of the matrix. The drive units are powered by the frequency converters, with all drive units that have been assigned to the same row or column being powered by the same frequency converter.

2. Three electronic contactors and/or relays are provided for each drive unit.

3. When the transport unit is moved along a row or column of the matrix, the electromagnets of the respective following drive unit are switched by means of the electronic contactors and/or relays in such a way that a jerk-free transfer of the transport unit from one drive unit to the respective following one takes place.

It is particularly advantageous herein that the number of frequency converters required to supply the electromagnets or the drive units scales only linearly with the number of rows and columns. Conventional methods for actuating planar motors require one or even two frequency converters per drive unit, i.e. per cell of the matrix (i.e. per intersection of one row and one column). Their number would therefore normally increase quadratically with the number of rows/columns. The method just described is therefore advantageous for planar motors with at least four drive units, and the advantage increases disproportionately as the size of the system increases. Since frequency converters are costly power electronics components, both the initial cost and the operating cost (due to power consumption) are reduced.

Further details and features result from the following description of preferred embodiments in combination with the figures. The respective features may be implemented individually or in combination with one another. The possibilities for solving the problem are not limited to the embodiments. For example, range specifications always include all—unmentioned—intermediate values and all conceivable subintervals.

The embodiments are shown schematically in the figures. Identical reference numerals in the individual figures designate identical or functionally identical elements or elements corresponding to each other with regard to their functions. In detail.

Figure 1:
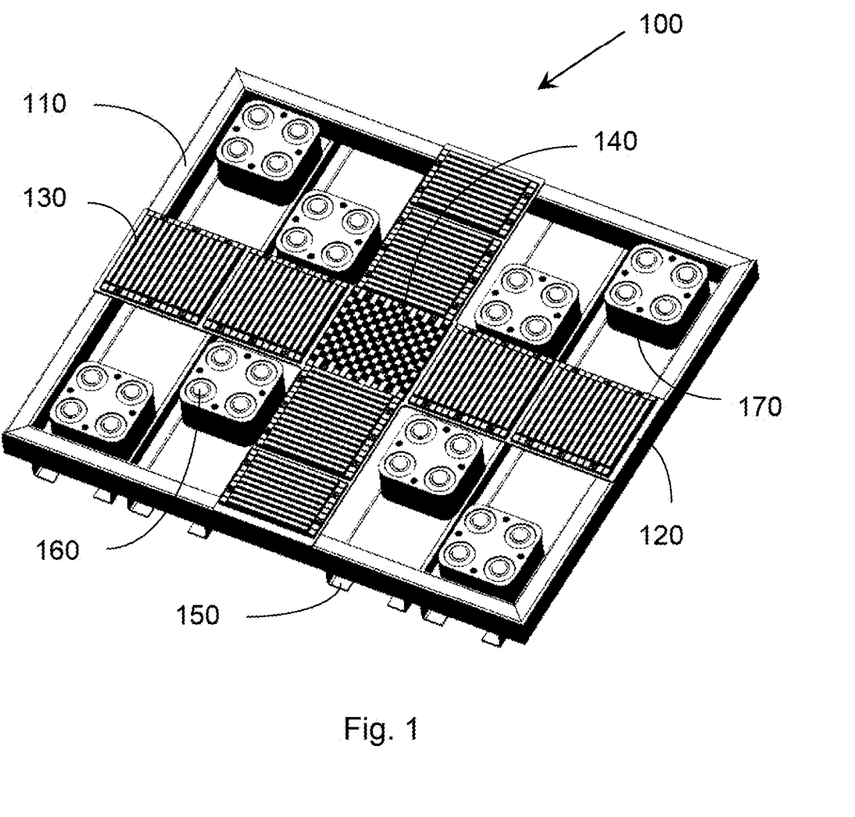
FIG. 1 shows a view of the underside of a transport unit of a planar motor according to the invention.

FIG. 1 shows a view from below of a transport unit 100 of a planar motor according to the invention. This transport unit has a rectangular base with a frame 110. With the exception of the area where the arms of the cruciform area intersect, strip-shaped permanent magnets 130 are attached to a predetermined cruciform area 120 in such a way that they cover the cruciform area 120, except for small separations. The permanent magnets 130 are mounted perpendicular to the respective arms of the cruciform area 120. Their north and south poles are oriented in a known manner upwards and downwards respectively, preferably alternately. In the zone where the arms of the cruciform area 120 intersect, in this example small square permanent magnets 140 are arranged in a checkerboard pattern. However, these are not absolutely necessary.

In the areas of the transport unit outside the cruciform area 120, ball transfer units 160 are arranged in corresponding receptacles 170 on cross members 150 connected to the frame 110 in this transport unit. These serve as a roller system to ensure the movability of the transport unit 100.

Figure 2:
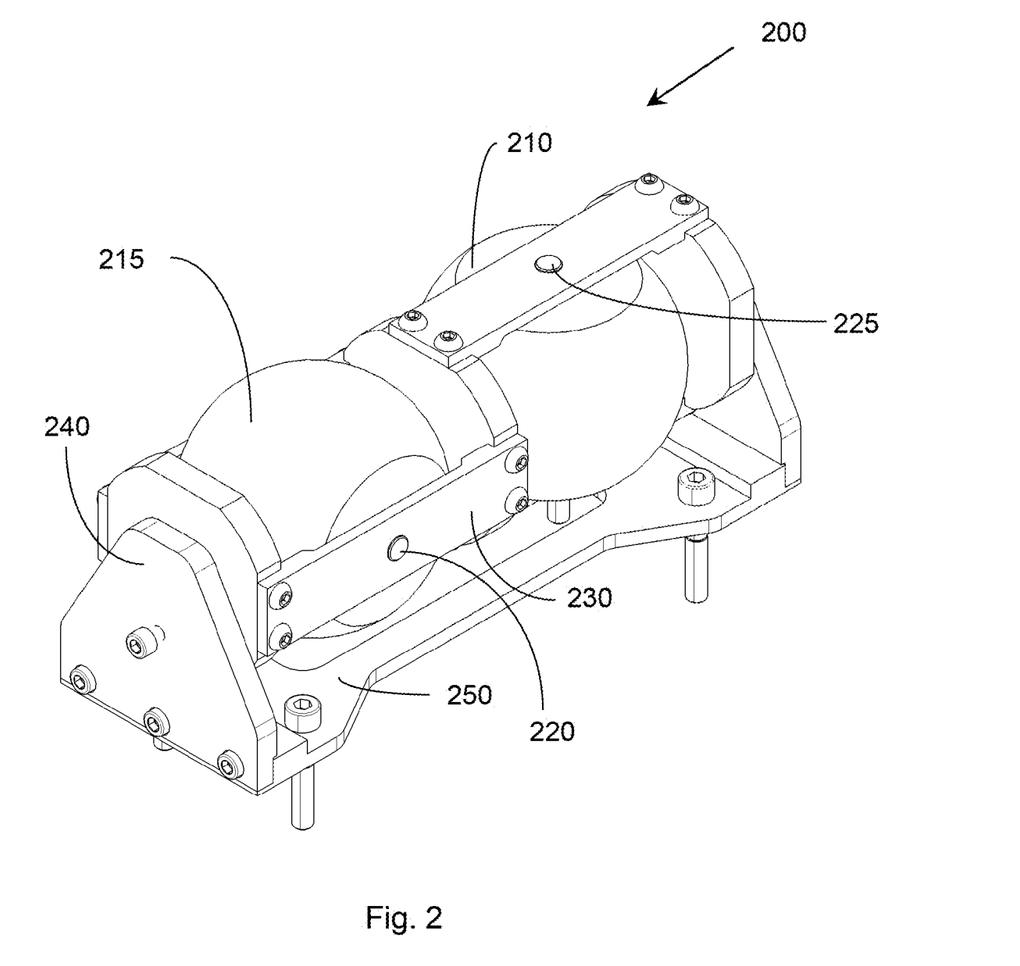
FIG. 2 shows an illustration of a multiaxial roller.

FIG. 2 shows a multiaxial roller 200 of the type preferred as a roller system in transport units of the planar motor. Two substantially spherical rollers 210, 215, whose axes of rotation 220, 225 are perpendicular to one another, can be seen. The spherical shape of the rollers is somewhat truncated on both sides perpendicular to the respective axis of rotation. The rollers 210, 215 are mounted in a frame 230 which in turn is rotatable about a central axis 240 which is arranged perpendicular to the two axes of rotation 220, 225 of the two rollers 210, 215. Crucially, the rollers have a larger diameter than the frame 230 in its plane of rotation. The frame 230 is in turn mounted in a mounting 250, with which the multiaxial roller can be attached, for example, to a transport unit. Due to the three perpendicular axes of rotation, rotations in any direction are possible, which in turn allows movements of the transport unit in any direction. For this purpose, no special resistances have to be overcome, especially not in the case of directional changes, as is the case with ordinary swivel castors. Compared with omni-wheels or Mecanum wheels, multiaxial rollers offer the advantages of a considerably simpler design with fewer parts, i.e. they are more robust and less prone to failure.

Figure 3:
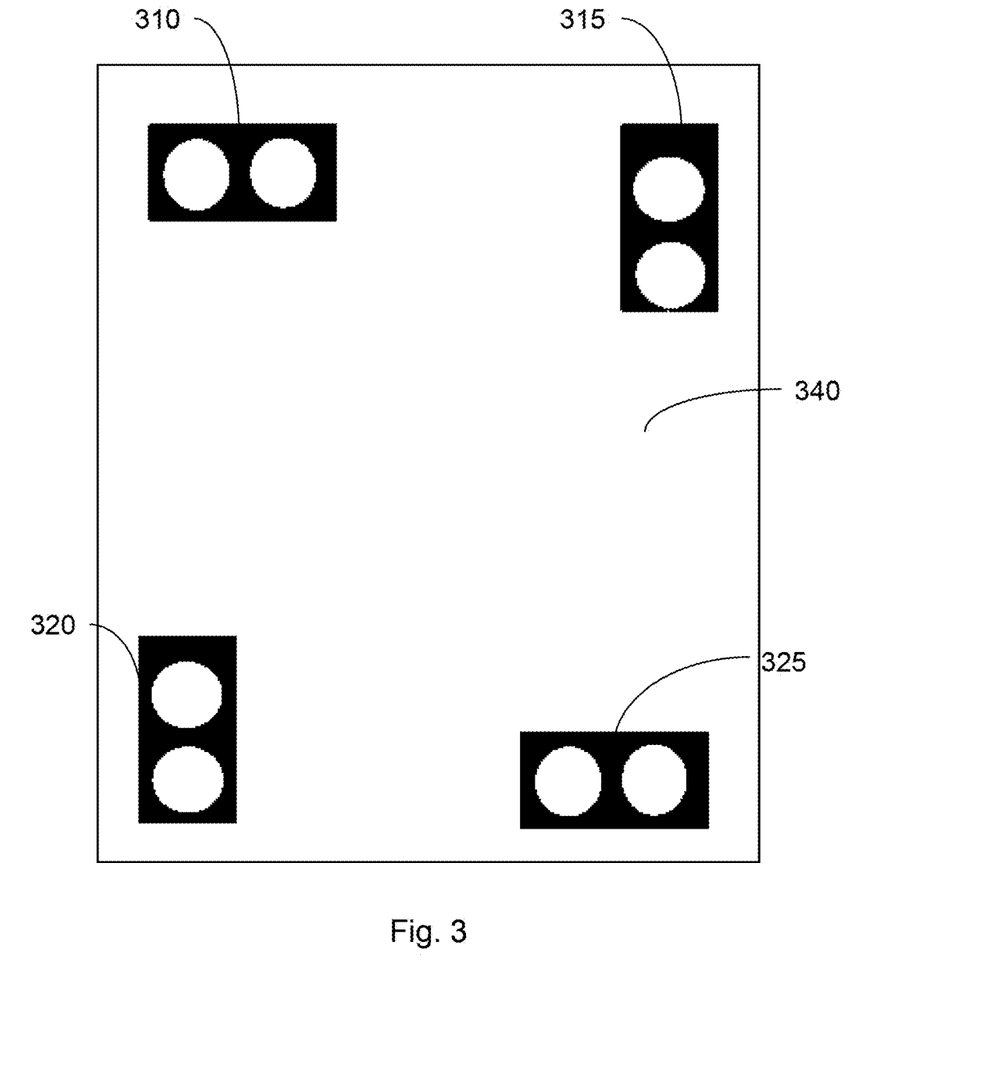
FIG. 3 shows a schematic representation of a possible arrangement of multiaxial rollers on a transport unit of a planar motor according to the invention.

FIG. 3 shows schematically how multiaxial rollers 310, 315, 320, 325 can be arranged on a square transport unit 340. This arrangement is designed to be as symmetrical as possible for movements in each direction. However, other arrangements are of course also conceivable.

Figure 4:
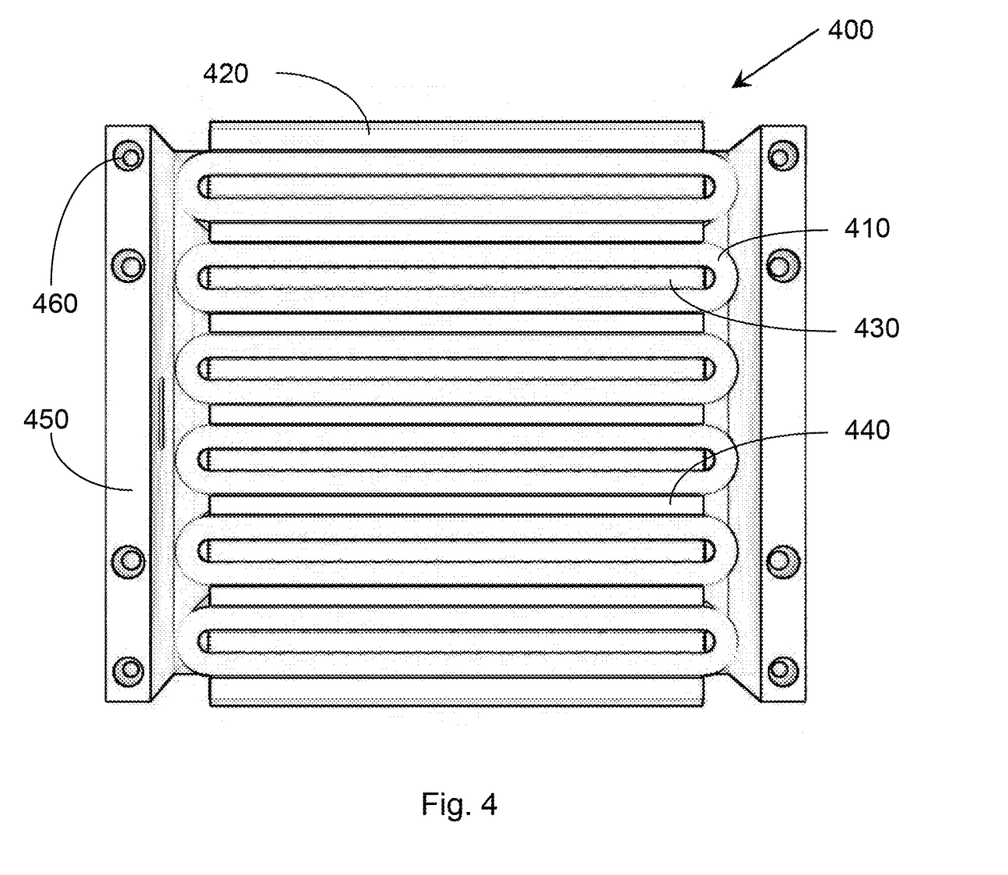
FIG. 4 shows an exemplary design of a drive unit with 6 electromagnets.

FIG. 4 shows a drive unit 400 in which six electromagnets with coils 410 are grouped. The electromagnets all share a common yoke 420 which, in addition to the cores 430 of the coils 410, also has additional elements 440 between the coils or outside the coils. However, these are not necessary and may be omitted in alternative embodiments. The electromagnets and the yoke are arranged in a common frame 450, which may have, for example, fastening means 460 (holes for screw connections) and power connections.

The frame 450 is typically made of aluminum or iron. However, it could also be omitted or made of other materials such as polymers. The frame fixes the el-ectromagnets and parts of the wiring and electronic components and connects them to the floor structure.

The electromagnets are elongated and arranged one behind the other perpendicular to the direction in which this drive unit can move a transport unit. Provided that there are corresponding permanent magnets as counterparts on the transport unit, the full extension of the electromagnets can therefore contribute to the force effect. The use of exactly six electromagnets in a drive unit is particularly advantageous. If the distances between the permanent magnets on the transport unit are correctly matched to the distances between the electromagnets in the drive unit (particularly preferably 1.5 times), the first and fourth or the second and fifth or the third and sixth electromagnets can together make a maximum contribution to the acceleration of the transport unit at a given time. Starting is thus smoother than with other configurations.

Figure 5:
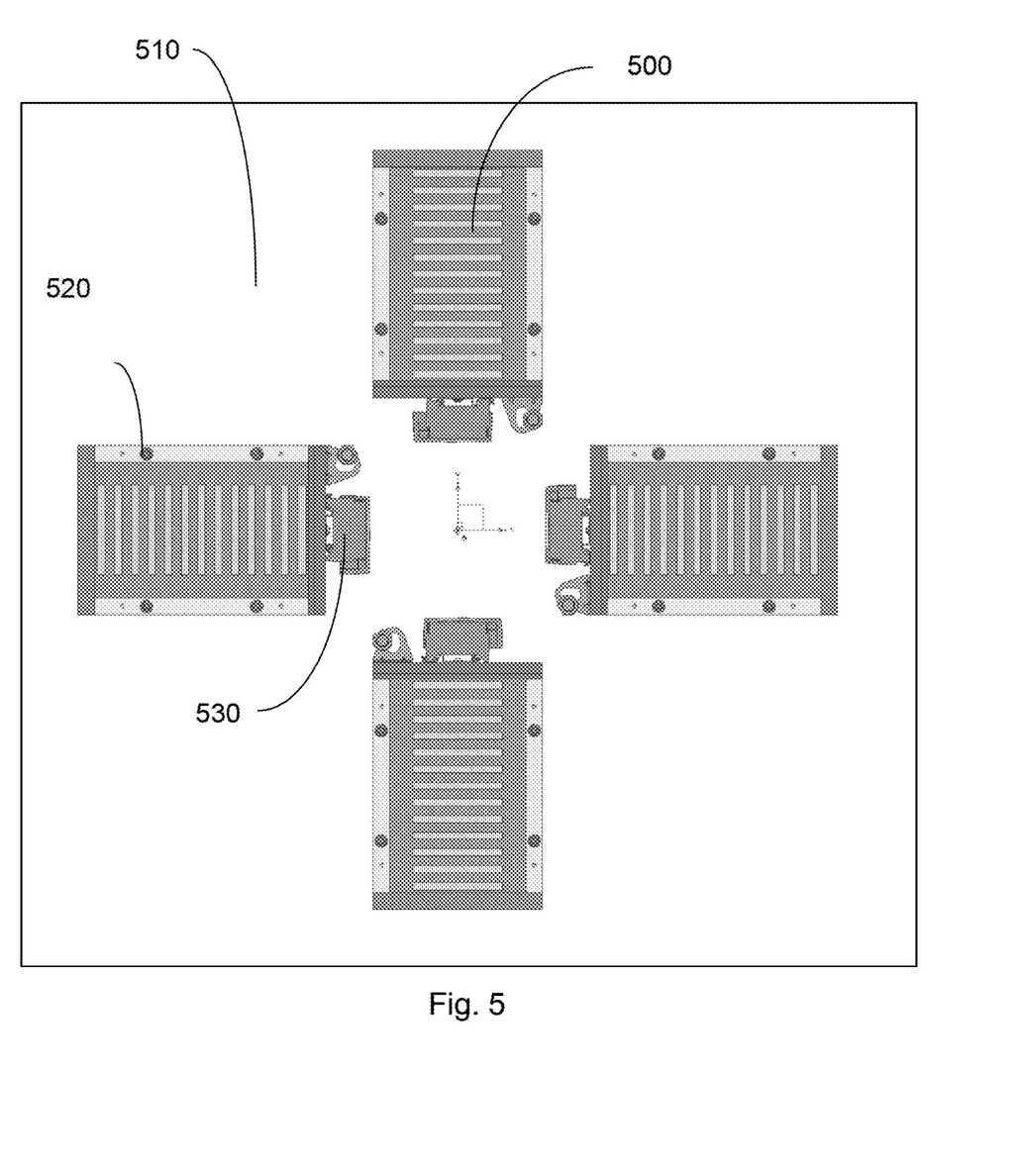
FIG. 5 shows a possible arrangement of drive units in a planar motor.

FIG. 5 illustrates how drive units 500 (as shown in FIG. 4) may be arranged for use in a planar motor. For this purpose, they may be mounted or cast on a base plate or frame or other structure 510, e.g., by means of screw connections 520. Plugs 530 and cables (not shown) are respectively used to supply power to the drive units. The entire arrangement of FIG. 5 disappears under a cover or floor on which the transport units can travel for operation of the planar motor. This cover or floor must allow the magnetic fields to pass through.

Figure 6:
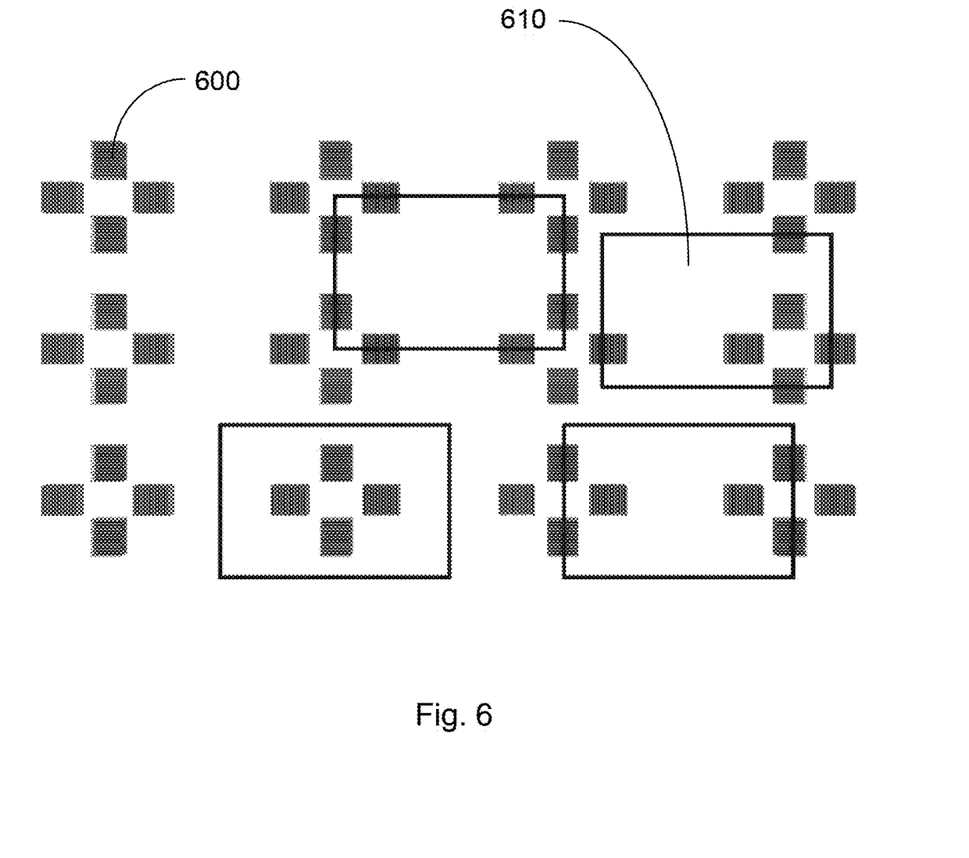
FIG. 6 shows an arrangement of drive units according to the invention depending on the area of rectangular transport units covered with permanent magnets.

FIG. 6 shows how a possible arrangement of drive units 600 in a planar motor may be designed in order to maintain the intended density of the electromagnets or drive units for transport units with a schematically indicated rectangular area 610 covered by permanent magnets. The arrangement is selected in such a way that two drive units serving as drive for the respective direction are covered by the surface 610 both in direction x and in direction y at all times. Partially covered drive units are counted as a corresponding fraction.

Since the area 610 is rectangular, the separations in one dimension are larger than in the other. However, the area could also be arranged in a square, in which case the linear units with their electromagnets would be positioned according to the dimensions. Due to the lower density of the electromagnets or drive units 600 compared to other planar motors, the costs (both acquisition costs per area and operating costs) can be reduced considerably. Nevertheless, an optimal traversability of the transport units is always guaranteed.

Figure 7:
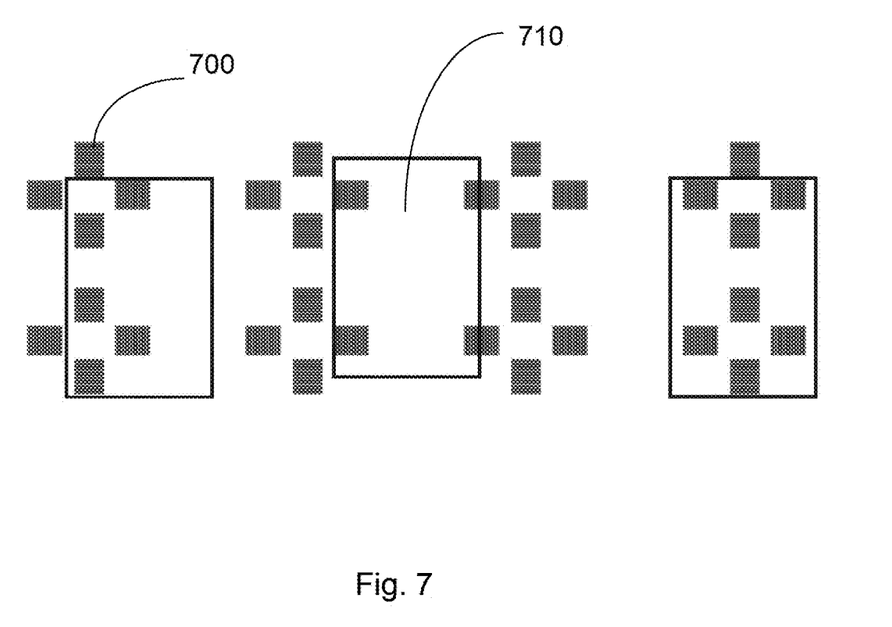
FIG. 7 shows an arrangement as in FIG. 6 with other rectangular transport units.

In FIG. 7, on the other hand, it can be seen how the arrangement of drive units 700 from FIG. 6 is not matched to those transport units rotated by 90°. It is true that at least two drive units are covered by the rectangular area 710 covered by permanent magnets in direction x (in FIG. 7 from left to right) at all times, so that an optimum movability of the associated transport units is always ensured. In direction y, however, in the case of some transport units, considerably more (e.g. three) drive units are covered. At the same time, there are positions in which no drive units (in direction y) are covered at all (see transport unit 710).

Optimum movability of the transport units can therefore no longer be guaranteed, since positions exist from which movement is only possible in one dimension. In order to still be able to move the transport unit in direction y, it must first be moved a short distance in direction x until it is once again above drive units that enable movement in direction y.

As a consequence, an optimal arrangement for transport units with an essentially rectangular area covered by permanent magnets is only given if a) the side lengths of the rectangle differ only slightly or b) no rotations of the transport units are intended.

The absence of rotations is not a serious problem in practical applications, e.g. in warehouses, since travel movements typically take place along paths arranged at right angles and the transport units must therefore also be arranged in target positions arranged at right angles.

Figure 8:
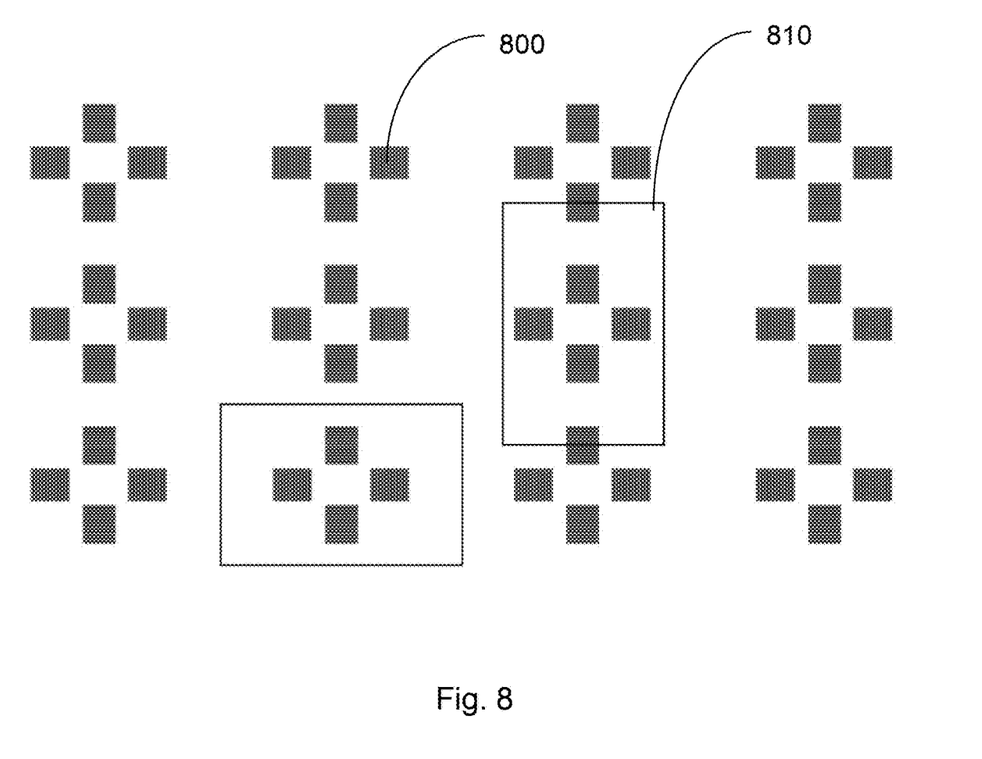
FIG. 8 shows an arrangement as in FIG. 6 with partly rotated rectangular transport units.

FIG. 8 shows an arrangement as in FIG. 6 with partly rotated rectangular transport units. In this arrangement it is also possible to move the transport units 810 in direction x and direction y, even if the separations of the drive units 800 are not ideally designed for each orientation of the transport units.

Figure 9:
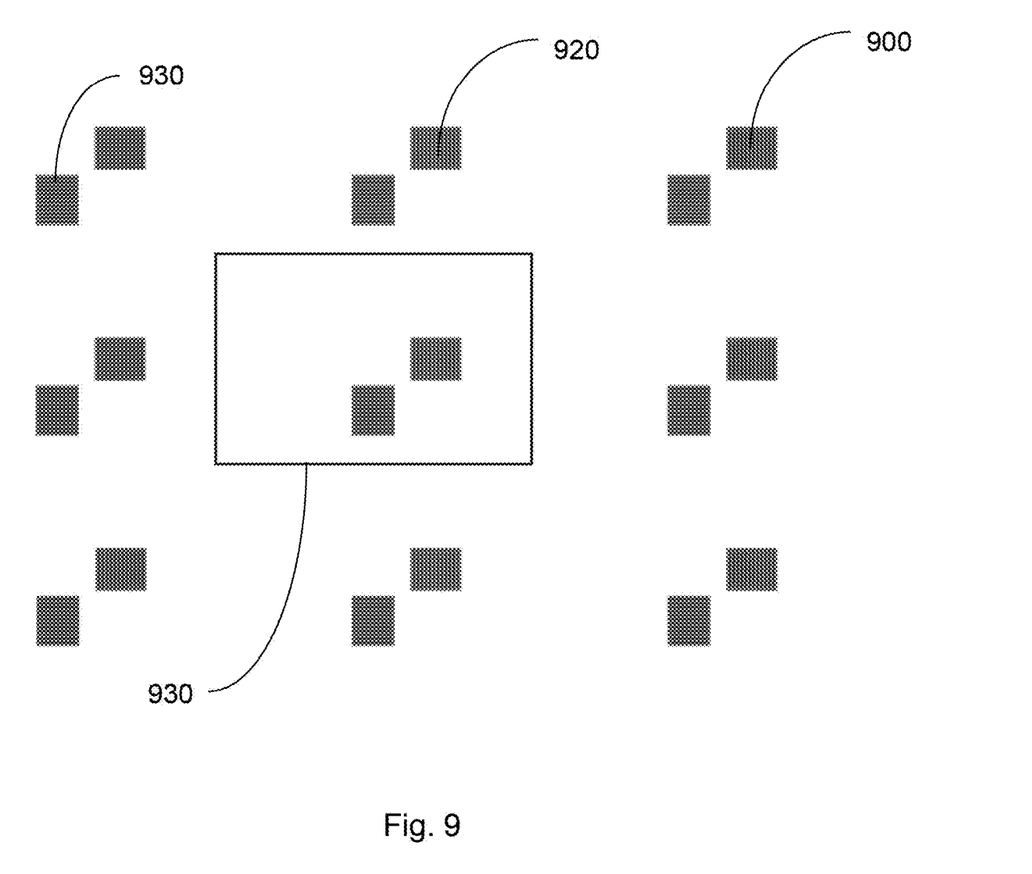
FIG. 9 shows a planar motor with only two drive units and the transport units.

FIG. 9 finally shows a planar motor with the minimum number of drive units 900 on the surface area. There is exactly one drive unit 920 for a movement in direction x and exactly one drive unit 930 for a movement in direction y under the predetermined area 910 of the transport unit covered by the permanent magnets at all times.

Glossary

Contactor

A contactor is an electrically or electromagnetically operated switch for high electrical power and is similar to a relay. The contactor has two switching positions and normally switches monostable without special precautions.

When a control current flows through the solenoid coil of an electromechanical contactor, the magnetic field pulls the mechanical contacts into the active state. Without current, a spring restores the rest state, and all contacts return to their initial position. In a contactor, the connections for control current for the solenoid coil as well as the contacts for auxiliary circuits (if any) and currents to be switched are isolated from each other: There is no conductive connection between control and switching contacts. In essence, a contactor is a relay with a much higher switching capacity. Typical loads start at about 500 watts up to several hundred kilowatts.

Contactors differ from relays in the following characteristics: a) Relays are designed for lower switching capacity, they usually do not have spark extinction chambers. b) The switching contacts of relays are single-breaking, while in contactors they are always double-breaking. c) Relays often use hinged armatures, whereas contactors usually use tie rods for the greater mechanical switching force required for the higher switching capacities and more solid contacts. However, these distinctive features are not mandatory, so a clear demarcation is not possible (according to https://de.wikipedia.org/wiki/Sch%C3%BCtz_(Schafter)).

Electromagnet

In the simplest case, an electromagnet consists of a coil with an iron core. As a result of an electric current, a magnetic field is formed in the coil, which is concentrated and amplified by the iron core. However, more complex designs are also possible in which, for example, several coils connected in series share an iron core. In any case, the coils are connected to each other and are actuated or energized together to generate a magnetic field.

Frequency Converter

A frequency converter, also referred to as frequency changer and also as an AC/AC converter, is a power converter that generates an AC voltage with a different frequency and amplitude from an AC voltage. Frequency converters should not be confused with transformers, which can only change the amplitude but not the frequency of the voltage.

If the frequency converter serves to directly supply an electrical machine such as a three-phase motor in the context of electrical drive technology and the frequency is derived from the state of the motor, the frequency converter is specifically referred to as a variable frequency drive (VFD). It then includes additional functions for motor control, such as speed measurement and methods for commutation in order to adapt the rotating field depending on the momentary state of the machine (according to https://de.wikipedia.org/wiki/Umrichter).

Hall Sensor

A Hall sensor (also Hall probe or Hall transducer, after Edwin Hall) uses the Hall effect to measure magnetic fields. Hall sensors consist of the thinnest possible crystalline doped semiconductor layers, which usually have four electrodes on the side. A current is injected through two opposing electrodes, and the two electrodes orthogonal to them are used to pick up the Hall voltage. When a magnetic field perpendicular to the layer flows through such a Hall sensor, it delivers an output voltage proportional to the (signed) magnitude of the vector product of magnetic flux density and current. The cause is the Lorentz force on the moving majority charge carriers in the layer. The output voltage is thus proportional to the current, to the charge carrier mobility and inversely proportional to the layer thickness (the thinner the layer, the greater the charge carrier velocity and the greater the Lorentz force).

A Hall sensor provides a signal even if the magnetic field in which it is located is constant. This is the advantage compared to a coil as a magnetic field sensor (e.g. induction loop, Rogowski coil), which only detects the derivative of the magnetic field with respect to time. Another important advantage of Hall sensors is that no ferro- or ferrimagnetic materials (such as nickel or iron) are required for their realization. Thus, the magnetic field to be measured is not already changed by bringing the sensor into it (according to https://de.wikipedia.org/wiki/HallSensor).

Length, Width

Drive units and transport units typically have a rectangular base. The larger of the side lengths is referred to as the length, the smaller as the width. In the case of a square base, this distinction does not apply.

Linear Motor

A linear motor is an electrical drive machine. Unlike the common rotating machines, a linear motor does not set the object (transport unit) driven by it in a rotating motion, but moves it on a straight or curved path (translational motion). The magnetic fields of the driven object or "rotor" and the magnetic fields of the stator ("track" "fixed device") are always combined in such a way that the object is pulled "forward" a distance. When the object has reached the position to which it has been pulled, other magnets are switched on, switched over or switched off accordingly, so that the object is pulled towards the next magnet. Due to the fact that the object has several slightly offset magnetic field generators, at least one of them is always just "halfway", which makes it possible to determine the direction of travel (forward or backward).

Load Carrier (Logistics)

In logistics, a load carrier is a load-bearing means of combining goods into a load unit. Load carriers include in particular the load-bearing transport aids pallet, container and vehicle (semi-trailer). Of these, the pallet is generally the preferred form. It facilitates the handling of the load units and thus promotes the efficiency and speed of the transport chain.

Mecanum Wheel

The Mecanum wheel is similar to the omniwheels. The auxiliary wheels or rollers are basically designed as crowned rollers and arranged at 45° to the axis of rotation. The inclined arrangement of the auxiliary wheels makes it easier to achieve a closed contour of the running surface. This enables the wheels to run similarly smoothly as normal wheels. Mecanum wheels are used, for example, in smaller robots for research or for moving very large loads (according to https://de.wikipedia.org/wiki/Omnidirektionaler_Antrieb). U.S. Pat. No. 3,876,255 A describes a mecanum wheel.

Omniwheel

In an omniwheel (also known as omnidirectional wheel), the wheel tread consists of rollers whose axes of rotation are at right angles to the axis of rotation of the main wheel. This allows low-friction displacement of the wheel in a lateral direction, i.e. in a direction parallel to the rotational axis of the main wheel (according to https://de.wikipedia.org/wiki/Allseitenrad). Omniwheels are described, for example, in the publications U.S. Pat. Nos. 1,305,535 A and 3,789,947 A.

Planar Motor

This is a generalization of a linear motor in which, for example, the stator(s) are arranged in such a way that a movement of mobile parts (runners, transport units or similar) in two dimensions can be achieved. In particular, the movement is not restricted by guides or rails or the like and thus does not follow a predetermined track. A form of a planar motor is shown e.g. in WO 2008/148513 A1.

Transport Unit

A transport unit is a single instance of the moving parts of a planar motor. Other common terms are rotor, mover, runner, shuttle, etc.

Width

See length.

REFERENCE NUMERALS 100 transport unit
110 rectangular frame
120 cruciform area
130 stripe-shaped permanent magnets
140 square permanent magnets
150 cross member
160 ball caster
170 mounting for ball caster
200 multiaxial roller
210, 215 essentially spherical roller
220, 225 axis of roller
230 rotatable frame
240 central axis of rotatable frame
250 mounting
310, 315, 320, 325 multiaxial rollers
340 square transport unit
400, 500 drive unit
410 coil
420 common yoke
430 core of coil
440 additional element of yoke
450 common frame of drive unit
460 fastening means or hole
510 base plate
520 screw connection
530 plug or connector
600 drive unit
610 area of transport unit covered by permanent magnets
700 drive unit
710 rectangular area of transport unit covered by permanent magnets
800 drive unit
810 area of transport unit covered by permanent magnets
900 drive unit
910 area of transport unit covered by permanent magnets
920 drive unit for direction x
930 drive unit for direction y

CITED DOCUMENTS

Cited Patent Documents

EP 1 443 632 A2
U.S. Pat. No. 1,305,535 A
U.S. Pat. No. 3,789,947 A
U.S. Pat. No. 3,876,255 A
WO 2008/148513 A1

The invention claimed is:

1. A planar motor, comprising:
at least one transport unit with permanent magnets, wherein the permanent magnets cover a predetermined area of the transport unit, said at least one transport unit having a predetermined length and a predetermined width; and
plurality of electromagnets, wherein the electromagnets are formed and arranged such that they are able to move the transport unit in directions x and y, wherein a fixed number of electromagnets are grouped into drive units, respectively, wherein the fixed number is at least three and at most eighteen, wherein the electromagnets grouped in a drive unit cause the transport unit to move in the same direction, wherein the drive units have a predetermined length and a predetermined width;
wherein:
the smaller dimension of length or width of the transport unit corresponds to at least the sum of twice the length of a drive unit and twice the width of a drive unit; and
the drive units are arranged distributed over the surface area of the planar motor in such a way that at all times exactly two drive units effecting a movement in direction x, and exactly two drive units effecting a movement in direction y, are located below the predetermined area of the transport unit covered by the permanent magnets, wherein drive units partially located below the predetermined area are counted as a corresponding fraction.

2. A planar motor, comprising:
at least one transport unit with permanent magnets, wherein the permanent magnets cover a predetermined area of the transport unit, said at least one transport unit having a predetermined length and a predetermined width; and
a plurality of electromagnets, wherein the electromagnets are formed and arranged such that they are able to move the transport unit in directions x and y, wherein a fixed number of electromagnets are grouped into drive units, respectively, wherein the fixed number is at least three and at most eighteen, wherein the electromagnets grouped in a drive unit cause the transport unit to move in the same direction, wherein the drive units have a predetermined length and a predetermined width; wherein:

the smaller dimension of length or width of the transport unit corresponds to at least the sum of twice the length of a drive unit and twice the width of a drive unit; and the drive units are arranged distributed over the surface area of the planar motor in such a way that at all times exactly one drive unit effecting a movement in direction x, and exactly one drive unit effecting a movement in direction y, are located below the predetermined area of the transport unit covered by the permanent magnets, wherein drive units partially located below the predetermined area are counted as a corresponding fraction.

3. The planar motor according to claim 1, wherein a predetermined number of electromagnets have a common yoke.

4. The planar motor according to claim 1, wherein each electromagnet has at least one coil, wherein the coils of the electromagnets are made of copper-clad aluminum wire.

5. The planar motor according to claim 1, wherein the transport unit has
   a square or rectangular base and/or
   a base with dimensions corresponding to a standard for load carriers and/or
   in particular a base with the dimensions of a Euro pallet.

6. The planar motor according to claim 1, wherein the predetermined area of the transport unit covered by the permanent magnets is cruciform.

7. The planar motor according to claim 6, wherein the permanent magnets are rectangular; and wherein the long sides of the rectangular permanent magnets are each arranged perpendicular to the direction of the arms of the cruciform surface which they cover.

8. The planar motor according to claim 1, wherein the transport unit has a wheel and/or roller system that allows movement in any direction.

9. The planar motor according to claim 8, wherein the wheel and/or roller system of the transport units is formed as either:
   multiaxial rollers and/or
   ball transfer units and/or
   omniwheels and/or
   Mecanum wheels and/or
   swivel castors.

10. The planar motor according to claim 1, wherein:
    the planar motor has Hall sensors for detecting the position of the transport unit;
    the Hall sensors are arranged distributed over the surface area of the planar motor in such a way that at least one Hall sensor is located under the predetermined surface of the transport unit covered by the permanent magnets at all times;
    the Hall sensors are arranged distributed over the surface area of the planar motor in such a way that at least two Hall sensors are located under the predetermined surface of the transport unit covered by the permanent magnets at all times; and
    the Hall sensors are arranged distributed over the surface area of the planar motor in such a way that at least three Hall sensors are located under the predetermined surface of the transport unit covered by the permanent magnets at all times.

11. The planar motor according to claim 1, wherein the planar motor has inductive proximity switches instead of Hall sensors for detecting the position of the transport unit.

12. The planar motor according to claim 1, wherein the fixed number of electromagnets grouped in a drive unit is an integer multiple of three.

13. The planar motor according to claim 12, wherein exactly six electromagnets for one direction of movement are grouped in a drive unit.

14. The planar motor according to claim 12, wherein the respective electromagnets grouped in a drive unit are shaped and arranged in such a way that their largest extension is oriented perpendicularly to the respective drive direction, and that they are arranged one behind the other in this drive direction.

15. The planar motor according to claim 1, wherein the electromagnets of a drive unit have a common yoke.

16. The planar motor according to claim 1, wherein the permanent magnets, which cover the predetermined area of the transport unit, are each arranged at a distance from one another which corresponds to 1.25 to 1.75 times, in particular 1.5 times, the distance between the electromagnets in a drive unit.

17. The planar motor according to claim 12, wherein:
    exactly three, six or nine electromagnets are grouped in a drive unit; and
    the length and/or the width of the transport unit is at least four times the length of a drive unit.

18. The planar motor according to claim 1, wherein the planar motor has exactly one frequency converter per predetermined area of the transport unit covered by the permanent magnets.

19. The planar motor according to claim 1, wherein:
    the electromagnets or drive units are arranged in rows and columns of a matrix, wherein the electromagnets or drive units are assigned either to the rows or to the columns of the matrix depending on whether they effect a movement of a transport unit in direction x or in direction y;
    the planar motor has exactly one frequency converter for each row and for each column of the matrix; and
    the frequency converters energize the electromagnets or drive units, wherein all electromagnets or drive units assigned to the same row or column are energized by the same frequency converter.

20. The planar motor according to claim 1, wherein:
    the electromagnets or drive units are arranged in rows and columns of a matrix;
    the electromagnets or drive units are assigned either to the rows or to the columns of the matrix depending on whether they effect a movement of a transport unit in direction x or in direction y; and
    the planar motor has merely exactly one frequency converter for each row of the matrix.

21. A method for actuating a planar motor according to claim 19, wherein three electronic contactors and/or relays are provided for each drive unit, the method comprising:
    moving the transport unit along a row or column of the matrix; and
    while moving the transport unit along the row or column, switching the electromagnets of the respective following drive unit in such a way that a transfer of the transport unit from one drive unit to the respective following one takes place.

* * * * *